Patented Nov. 2, 1937

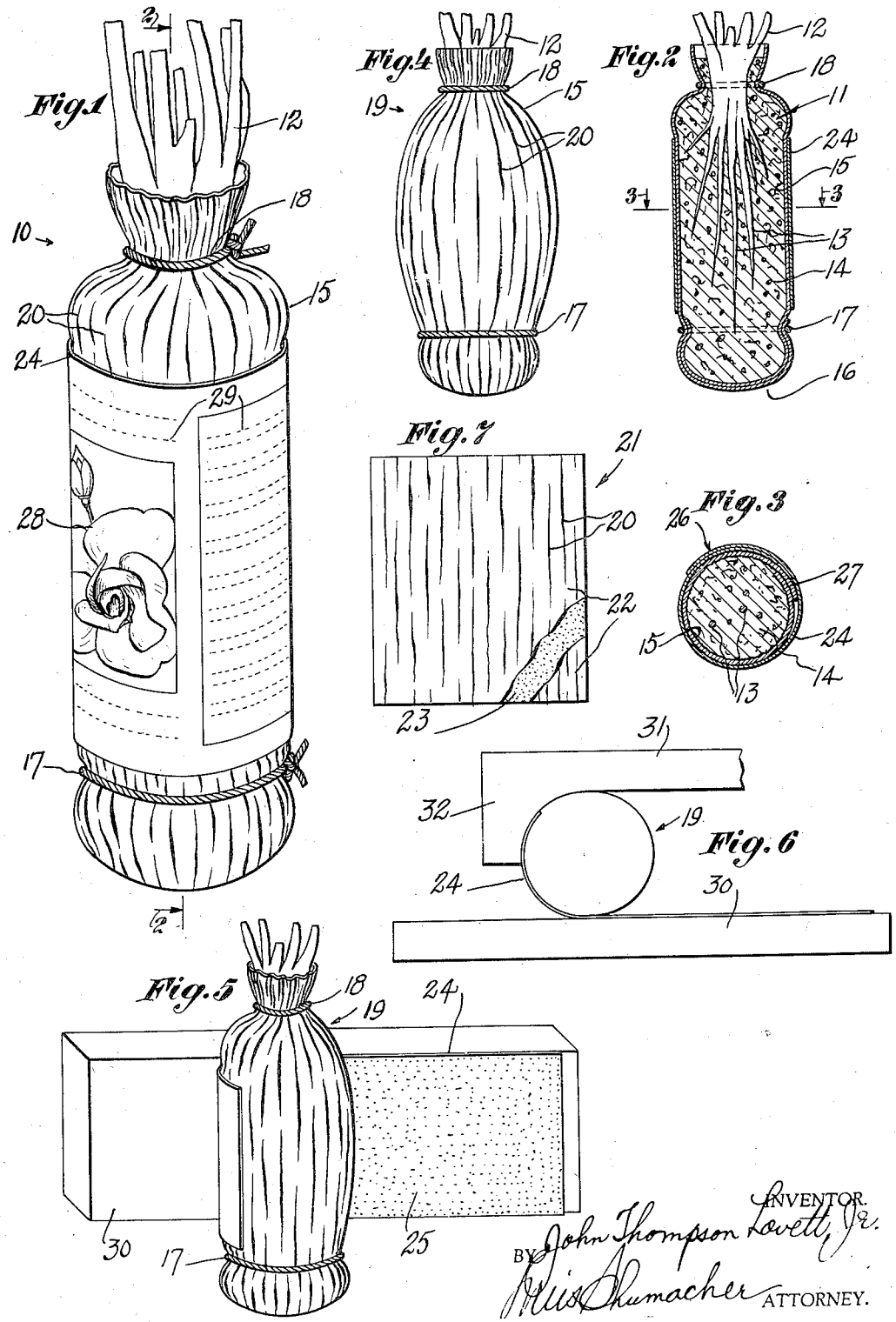

2,097,929

UNITED STATES PATENT OFFICE 2,097,929

PLANT BALL PACKAGE AND METHOD OF MAKING THE SAME

John Thompson Lovett, Jr., Little Silver, N. J.

Application February 27, 1936, Serial No. 65,937

5 Claims. (Cl. 47—37)

This invention relates to the art of packaging plants.

One object of the invention is to provide a neat, compact and safe plant package embodied in a unitary structure, the parts whereof are so related that a picture of the plant in bloom and indicia relating thereto may be carried by the package provided and without the necessity of using any special box or other preformed constructions.

In the nursery art in which plants are sold in relatively dormant state to the ordinary purchasing public, it is desirable that the plant shall be packaged in such a manner as to be adapted to be kept alive for a long period of time and without the necessity of watering the same or of expending any particular care thereon. It is further desirable that such a plant shall have associated therewith a picture of the plant in bloom in order that the purchaser may readily know the type of plant that he is buying, and, at the same time, matters descriptive of the nature of the plant and how it is to be transplanted and treated, ought to be coordinated with the plant so as to assure that the plant will not be damaged in the handling thereof by those who are unfamiliar with the nature of the plant. Preferably, the various indicia directed to the plant ought to be a permanent portion of the plant package and in such compact relation thereto that the indicia will not be lost or torn or constitute an obstruction in the ordinary handling of the plant package in the store. Likewise it is essential that the structure of the plant package as well as the method of producing the same shall be as inexpensive as possible in order to permit the ready sale of safely packaged plants in competition with such plants as may be sold with their roots relatively bare and exposed.

It is therefore another object of the invention to furnish a device of the nature set forth which shall fulfill the requisites mentioned and be free of certain disadvantages heretofore encountered as where special boxes were utilized which not only greatly increased the cost of the article, but required greater space in shipment and more care in the handling of the article to prevent crumpling of or other damage to the carton.

Another feature that is desirable in the nursery art heretofore referred to is that in addition to the picture and/or descriptive matter relating to the plant, it is desirable that at least a section of the plant stem be exposed to the view of the prospective purchaser so that he may readily observe whether the plant appears to be alive and in good condition. By my invention these characteristics are carried through to a much further degree since I provide for visibility of the entire plant above the roots thereof so that the entire stem and branches may be readily observed whereby the purchaser can readily check to see whether any portion of the plant has been damaged or whether any deterioration of the plant has begun.

Another object of the invention is to provide an improved plant ball package which can be made substantially entirely of sheet material in ordinary flat form arranged and coordinated to assume a complete package form in assembling the device, whereby the cost of the same may be kept at a minimum.

An important object of the invention is to provide a plant ball package comprising moisture retaining material packed snugly around the roots so as to exclude air spaces and to assure maximum retention of moisture by reason of the close packing of the material and by virtue of the moisture proof casing therefor and with the moisture retaining material so transversely finally compressed around the plant roots as to prevent longitudinal tensioning and tearing of delicate root portions upon tightly packing the material.

While tightness in the packing of the moisture retaining material is desirable for the reasons mentioned, heretofore considerable damage to the plant roots and consequently to the entire plant structure has frequently occurred upon inserting the plant ball into a carton or the like and then packing the material tightly down into the carton about the roots. Since the packaging must be rapidly and vigorously effected, movement of the material relative to the roots has often resulted in tearing of the roots and particularly in destruction of the root hairs upon which the plant relies primarily for absorption of nutriment from earth or other material.

A further object of the invention is to provide a device which shall have the advantages alluded to and be free of the defects mentioned; a device having improved means whereby the indicia bearing band or label is utilized as a structural part of the package to transversely compress a moisture proof crepe paper wrapping for the plant ball and simultaneously afford a smooth seat for an uncrumpled positioning of the label or band; and a device having relatively few and simple parts and which can be inexpensively manufactured and assembled to produce a package that is neat in appearance, compact, easy and convenient to handle, durable, reliable and efficient to a high degree in use.

A further object of the invention is to provide an improved method for making a plant package whereby final compression of plant sustaining material and construction of the package itself are effected in the act of making the plant package.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective view in elevation showing a plant package embodying the invention.

Fig. 2 is a vertical sectional view on a reduced scale.

Fig. 3 is a transverse horizontal sectional view thereof.

Fig. 4 is a view in elevation showing a partially constructed package.

Fig. 5 is a perspective plan view showing a step in the method of manufacturing the package.

Fig. 6 is a view in elevation thereof.

Fig. 7 is a plan view on a reduced scale of the sheet of material used for forming the primary wrapping for the plant ball and having parts removed to show the construction thereof.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may be best exemplified in a plant ball package comprising a plant ball which may include the plant stem 12, roots 13 and any material 14 adapted to supply food, moisture or both to the plant and packed around the roots thereof. Desirably the material 14 is a moss, which is used particularly for rose bearing plants.

Encasing the plant ball 11 is a casing 15 of a relatively pliable material of a water proof character and of considerable strength. The casing 15 preferably consists of a flat oblong sheet of paper wound around the plant ball 11, with portions suitably infolded and overlapped at the bottom as at 16 to be thus retained by the overlapping lateral winding wall of the casing, in a manner well known, so that the bottom is provided without requiring any special fastening or securing means. Tension elements such as bands or cords 17, 18 are tied around the casing, and may be knotted as shown. These elements are in relative proximity to the ends of the longitudinal package which is thus produced and shown at 19. The cord 17 serves to aid in securement of the overlapped bottom portions 16, as indicated. The cord 18 snugly secures the casing 15 about the plant stem. Both of the cord elements cause the adjacent portions of the plant sustaining material 14 to be snugly compressed around the plant roots.

The material of which the casing 15 consists is desirably creped, preferably longitudinally, as indicated at 20. The reason for the creping is that this material, which is a well known commodity, consists of a double layer of paper as shown at 21, including layers of paper 22, and an intermediate adhesive waterproofing layer 23, as of tar or the like. This strong material is rendered pliable and workable by the creping, so that the material can be easily wrapped around the plant ball and folded and secured thereon in such snug relation, with the material yielding to avoid formation of crevices and the like, and hence to obtain a moisture tight casing 15. If a stiff or uncreped paper were used, the making of the package 19 would obviously be much more difficult. The creping also affords a degree of elasticity in the paper for easy manipulation thereof, and permits use of a paper of any required strength to avoid tearing of the paper in packaging.

The portion of the wrapping 15 intermediate of the tension elements 17, 18 may desirably be free of any tension means to prevent obstruction of the outer face or seat of the wrapping for the compressing band or label 24. Hence the plant ball 11 reacts to tend to bulge the casing 15 outward intermediate of the tension elements 17, 18.

The compressing device or band label 24 may consist of any suitable relatively non-stretching sheet material preferably paper, of any desired shape, preferably rectangular. This device 24 may be constructed to encircle the package 19 so as to cover a substantial or major portion of the wrapping 15 between the tension elements 17, 18 and to snugly tensioningly engage around the same to thus cause compression of the plant ball 11.

Preferably the band device 24 is in the nature of a long relatively wide flat band which is wound transversely around the wrapping 15 and secured thereto in a suitable manner. For instance, one face of the band label 24 may have a layer of adhesive 25 for continuous adhesive connection with the wrapping 15. The ends of the band label may overlap as at 26 to a substantial degree to prevent loosening of the band label while the adhesive is setting. A quick setting adhesive may, of course, be used. It will be noted that the overlap at 26 is angularly spaced from that at 27 in the side wall of the wrapping 15, for maximum strength. The degree of overlap at 27 may be as great as desired, and may include a complete double encirclement of the plant ball.

The band label 24 may have on its normally exposed outer face indicia relating to the plant, including, for instance, a picture 28 of the rose in bloom, and printed matter 29 including directions concerning treatment of the plant.

The method of making the device 10 will now be described in order to further elucidate the nature of the device. The band label 24 is placed upon a plank or table 30 which may be the same width as the label, and the adhesive face 25 wetted. Then the plant package 19 is placed in suitable position on the band label, and rolled therealong as indicated by the arrow, to cause the band label to become adhesively connected to the wrapping 15. While the plant package is being rolled, pressure is exerted thereon with the hands or by means of a flat tool such as 31 having a concave or curved toe portion 32, so that in the article 10, the plant ball 11 has thus received its final compression, to be so maintained by the plant label, and with the lateral bulge shown in Fig. 4 removed to afford a uniform seat for even uncrumpled seating of the band label permitting a neat appearance of the indicia 28, 29 thereon. By reason of the continuous adhesion between members 15 and 24, distortion of the pliable material of the casing 15 is avoided in handling of the plant package.

By this invention, the material 14 of the plant ball is tightly compressed about the roots of the plant so that the latter may thus more easily absorb plant food or moisture, and likewise air spaces are avoided, and moisture more reliably retained due to the compressed condition of the plant ball. The element 24 performs the combined functions of a compressor, reenforcement and label or indicia carrying member, and lies perfectly smooth in contradistinction to the relatively rough seating thereof on the element 15. A minimum of cord and knotting is required, and the compression of the plant ball is wholly transverse and uniform, causing a minimum longitudinal strain on the plant roots. The band 24 may consist of adhesive kraft paper, the usual adhesive being a quick drying fish glue. This band is applied and the glue sets almost instantly. The holding power of the glue is particularly effective at the overlap 26 of the band 24, and connection at the overlap may suffice for many purposes, although the continuous adhesion to the casing 15 is preferred for ease in assembling. The irregularities or projections in the casing surface will aid in rapid, effective connection with the band 24. Since the casing 15 is waterproofed, the moisture in the plant ball cannot penetrate to loosen the glue.

I claim:

1. A device including an elongated plant ball, a waterproof paper wrapping therefor creped longitudinally of the plant ball, tension elements extending around said wrapping in relative proximity to the ends thereof for snugly securing the wrapping in watertight compressing relation to the plant ball, one of the tension elements securing the wrapping in moisture tight relation to the stem of the plant, the portion of the wrapping intermediate of said tension elements being relatively free of tension elements so as to leave said portion comparatively smooth and free of obstructions, said wrapping being relatively pliable and directly subject to the plant ball so that the latter tends to cause outward bulging of the wrapping intermediate of the tension elements, and a band of paper wound transversely around the wrapping and being of substantial width so as to cover the major portion of the wrapping between the tension elements, said band being continuously adhesively united to said wrapping and being tensioned therearound to prevent said outward bulging of the wrapping, said plant ball comprising moisture retaining material maintained relatively uniformly tightly packed around the plant roots transversely thereto by the tension of said plant, avoiding longitudinal tension on the delicate root portions, and said band providing a smooth uncrumpled outer surface of large area carrying indicia relating to the plant, whereby a neat, safe, compact and unitary structure is afforded adapted to be easily handled and without relative slippage of parts.

2. A plant ball package including a plant ball, a casing formed about the same, said casing consisting of a waterproof multiply sheet material that is creped longitudinally of the plant ball to facilitate the forming of the casing, securing cords tensioned around the casing, said casing being secured at the lower end thereof to the plant ball, and at its upper end substantially directly about the plant stem, and a restraining band of a flat sheet material wound around said casing intermediate of the ends thereof, said band being continuously adhesively joined to the casing, said band providing a relatively smooth outer surface of substantial area adapted to receive indicia respecting the plant ball.

3. A plant ball package including a plant ball, a water proofed paper wrapping creped longitudinally of the plant ball and folded therearound to provide bottom and side walls and a neck directly about the plant stem, tension means snugly engaging around the neck and around the bottom portions of the side walls to render said wrapping a waterproof casing for the plant ball, and a band of sheet material wound around the wrapping intermediate of and in spaced relation to the neck and bottom portion of the side walls, said band having overlapping ends adhesively united, said band carrying a picture of the plant in bloom and constituting a smooth uncrumpled plant representation seated upon the rough surface of said creped wrapping.

4. A plant ball package including an elongated plant ball, a sheet of waterproof material wound coaxially about the plant ball and having fold portions to provide a bottom wall and a neck portion for the plant stem contracted therearound in moisture tight engagement with the stem, said sheet being creped longitudinally of the plant ball to facilitate formation of the neck portion to snugly embrace the plant stem, said sheet being securely maintained about the plant ball to provide a waterproof casing therefor, and a band of sheet material tensioningly wound around and secured on said casing with the creped formation yielding uniformly circumferentially to cause radial compression of the plant ball, said band overlying a substantial portion of said casing intermediate of the bottom and neck portion so that said band is of generally cylindrical shape, and said band having a picture of the plant in bloom and indicia relating thereto, with the stem of the plant being exposed to view.

5. A device including an enlongated plant ball, a waterproof paper wrapping therefor creped longitudinally of the plant ball, tension elements extending around said wrapping in relative proximity to the ends thereof for snugly securing the wrapping in watertight compressing relation to the plant ball, the upper end of the wrapper being contracted directly around the plant stem, the portion of the wrapping intermediate of said tension elements being relatively free of tension elements so as to leave said portion comparatively smooth and free of obstructions, said wrapping being relatively pliable and directly subject to the plant ball so that the latter tends to cause outward bulging of the wrapping intermediate of the tension elements, and a band of paper wound transversely around the wrapping and being of substantial width so as to cover the major portion of the wrapping between the tension elements, said band being in spaced relation to said tension elements, said band having its end portions adhesively united and being tensioned therearound to prevent said outward bulging of the wrapping, said plant ball comprising moisture retaining material maintained relatively uniformly tightly packed around the plant roots transversely thereto by the tension of said plant, avoiding longitudinal tension on the delicate root portions, and said band providing a smooth uncrumpled outer surface of large area carrying indicia relating to the plant, whereby a neat, safe, compact and unitary structure is afforded adapted to be esaily handled and without relative slippage of parts.

JOHN THOMPSON LOVETT, Jr.